United States Patent
Kasahara et al.

(10) Patent No.: US 10,049,497 B2
(45) Date of Patent: Aug. 14, 2018

(54) DISPLAY CONTROL DEVICE AND DISPLAY CONTROL METHOD

(71) Applicant: SONY CORPORATION, Tokyo (JP)

(72) Inventors: Shunichi Kasahara, Kanagawa (JP); Junichi Rekimoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 56 days.

(21) Appl. No.: 15/206,435

(22) Filed: Jul. 11, 2016

(65) Prior Publication Data

US 2016/0321843 A1 Nov. 3, 2016

Related U.S. Application Data

(63) Continuation of application No. 14/526,778, filed on Oct. 29, 2014, now Pat. No. 9,411,419.

(30) Foreign Application Priority Data

Nov. 13, 2013 (JP) .................................. 2013-234932

(51) Int. Cl.
*G06T 19/00* (2011.01)
*G02B 27/01* (2006.01)
(Continued)

(52) U.S. Cl.
CPC .......... *G06T 19/006* (2013.01); *G02B 27/017* (2013.01); *G02B 27/0172* (2013.01); *G06F 3/012* (2013.01); *G06F 3/013* (2013.01); *G06K 9/6201* (2013.01); *G06T 7/60* (2013.01); *G06T 7/70* (2017.01); *G02B 2027/014* (2013.01); *G02B 2027/0138* (2013.01); *G02B 2027/0178* (2013.01); *G02B 2027/0187* (2013.01)

(58) Field of Classification Search
CPC .......... G06K 9/00664–9/00704; G06F 3/0481; G06F 3/04817; G06F 9/4443; G06F 3/04847; G06F 11/3664; G06F 3/011; G06F 3/012; G06F 3/0304; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS 6,222,583 B1 4/2001 Matsumura et al.
7,015,951 B1 3/2006 Yoshigahara et al.
(Continued)

FOREIGN PATENT DOCUMENTS

JP 2012-212345 A 11/2012

*Primary Examiner* — Todd Buttram
(74) *Attorney, Agent, or Firm* — Chip Law Group

(57) ABSTRACT

There is provided a display control device including a matching section configured to match a first image or sensor data output from a first imaging device or a sensor worn on a head of a first user, to a second image output from a second imaging device worn on a part other than the head of the first user, a sight estimation section configured to estimate a region corresponding to a sight of the first user in the second image, on the basis of a result of the matching, and a display control section configured to generate an image expressing the sight of the first user using the second image on the basis of a result of the estimation of the sight, and display the image expressing the sight of the first user toward a second user that is different from the first user.

16 Claims, 11 Drawing Sheets

(51) Int. Cl.
*G06T 7/60* (2017.01)
*G06T 7/00* (2017.01)
*G06F 3/01* (2006.01)
*G06K 9/62* (2006.01)
*G06T 7/70* (2017.01)

(56) References Cited

U.S. PATENT DOCUMENTS

| | | | |
|---|---|---|---|
| 9,202,315 | B2 | 12/2015 | Kobayashi et al. |
| 2008/0211771 | A1* | 9/2008 | Richardson ............. A63F 13/10 345/158 |
| 2009/0213112 | A1* | 8/2009 | Zhu ........................ G06T 15/06 345/419 |
| 2011/0018868 | A1 | 1/2011 | Inoue et al. |
| 2011/0050878 | A1* | 3/2011 | Wells ..................... H04N 7/181 348/86 |
| 2012/0212499 | A1* | 8/2012 | Haddick ............ G02B 27/0093 345/589 |
| 2012/0300021 | A1* | 11/2012 | Otuka ................ H04N 5/23229 348/36 |
| 2012/0327194 | A1 | 12/2012 | Shiratori et al. |
| 2012/0329527 | A1* | 12/2012 | Kang ................ H04N 13/0059 455/566 |
| 2015/0089452 | A1* | 3/2015 | Dorninger ............ G06Q 10/101 715/848 |
| 2015/0123998 | A1* | 5/2015 | Chung Davidson .... G06T 11/60 345/636 |
| 2015/0124100 | A1* | 5/2015 | McRory ................ H04N 7/185 348/151 |

* cited by examiner

DISPLAY CONTROL DEVICE AND DISPLAY CONTROL METHOD

CROSS REFERENCE TO RELATED APPLICATIONS

The present application is a continuation application of U.S. patent application Ser. No. 14/526,778, filed Oct. 29, 2014, which claims the benefit of priority from prior Japanese Priority Patent Application JP 2013-234932 filed in the Japan Patent Office on Nov. 13, 2013, the entire content of which is hereby incorporated by reference.

BACKGROUND

The present disclosure relates to a display control device, a display control method, and a program.

In recent years, the technology called augmented reality (AR) which presents a user additional information superimposed on the real world is attracting attention. The information presented to the user in the AR technology is also called annotation, and can be visualized using virtual objects of various forms such as a text, an icon, and an animation. For example, JP 2012-212345A discloses a technology to realize the operation of the virtual object of AR, without impairing a sense of immersion of the user in the AR space.

SUMMARY

In the AR technology proposed in above JP 2012-212345A and others, for example, the image shot by a camera mounted on a wearable display is used to share the experience of a certain user with another user through visual perception. However, since the wearable display is mainly worn on the head of the user, the performance of the camera is limited, and the movement of the user sometimes causes the video image sickness, and makes the space recognition difficult.

Therefore, the present disclosure proposes a novel and improved display control device, a display control method, and a program capable of providing a more appropriate image for sharing the experience through the visual perception between the users.

According to an embodiment of the present disclosure, there is provided a display control device including a matching section configured to match a first image or sensor data output from a first imaging device or a sensor worn on a head of a first user, to a second image output from a second imaging device worn on a part other than the head of the first user, a sight estimation section configured to estimate a region corresponding to a sight of the first user in the second image, on the basis of a result of the matching, and a display control section configured to generate an image expressing the sight of the first user using the second image on the basis of a result of the estimation of the sight, and display the image expressing the sight of the first user toward a second user that is different from the first user.

According to another embodiment of the present disclosure, there is provided a display control method including matching a first image or sensor data output from a first imaging device or a sensor worn on a head of a first user, to a second image output from a second imaging device worn on a part other than the head of first user, estimating a region corresponding to a sight of the first user in the second image, on the basis of a result of the matching, and generating, by a processor, an image expressing the sight of the first user using the second image on the basis of a result of the estimation of the sight, and displaying the image expressing the sight of the first user toward a second user that is different from the first user.

According to still another embodiment of the present disclosure, there is provided a program for causing a computer to implement a function to match a first image or sensor data output from a first imaging device or a sensor worn on a head of a first user, to a second image output from a second imaging device worn on a part other than the head of the first user, a function to estimate a region corresponding to a sight of the first user in the second image on the basis of a result of the matching, and a function to generate an image expressing the sight of the first user using the second image on the basis of a result of the estimation of the sight, and display the image expressing the sight of the first user toward a second user that is different from the first user.

According to one or more embodiments of the present disclosure as described above, a more appropriate image is provided for sharing the experience through the visual perception between the users.

Note that the above effects are not necessarily restrictive, but any effect described in the present specification or another effect that can be grasped from the present specification may be achieved in addition to the above effects or instead of the above effects.

DETAILED DESCRIPTION OF THE EMBODIMENT(S)

Figure 1:
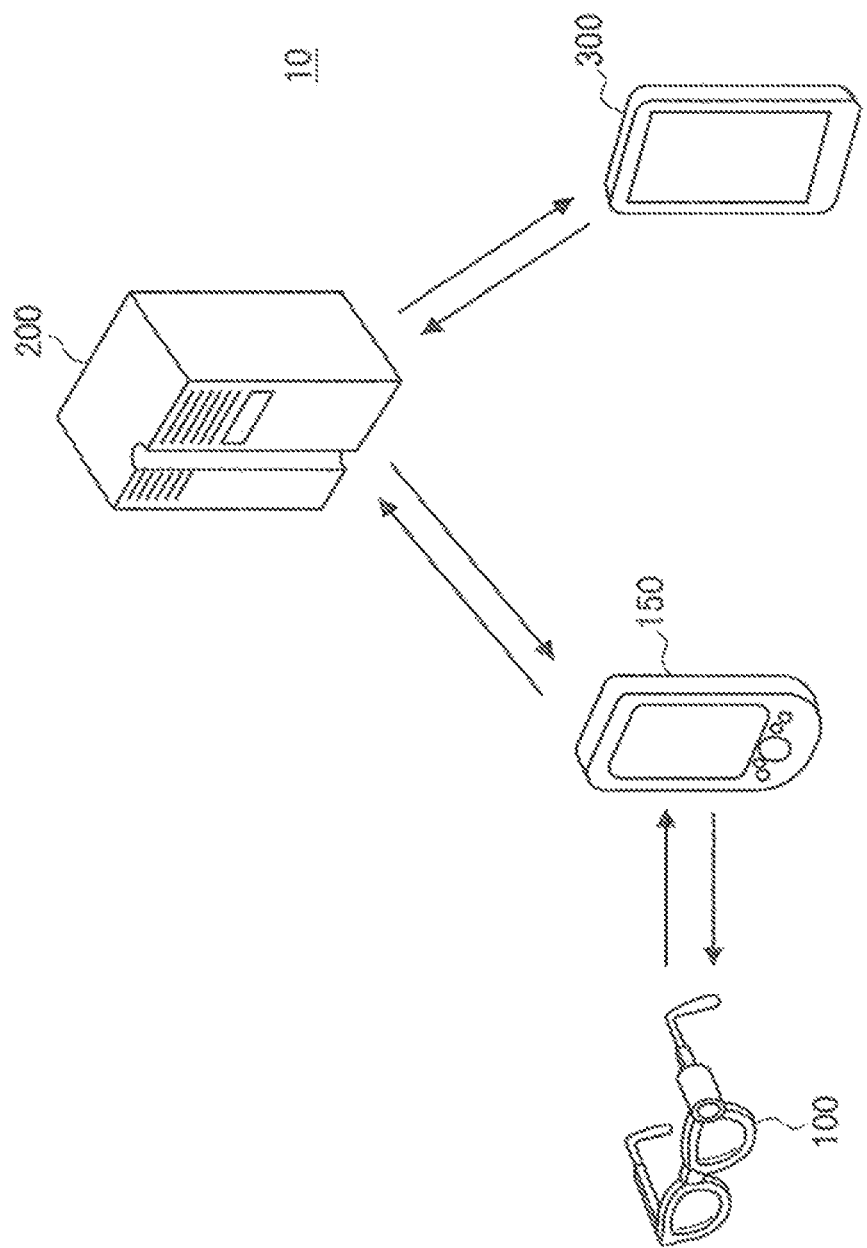
FIG. 1 is a diagram illustrating a schematic configuration of a system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be made in the following order.

1. First Embodiment
1-1. System Configuration
1-2. Device Configuration
1-3. Functional Configuration
1-4. Example of Process
1-5. Exemplary Display
1-6. Variant Example
2. Second Embodiment
3. Hardware Configuration
4. Supplement (1. First Embodiment)
(1-1. System Configuration)

FIG. 1 is a diagram illustrating a schematic configuration of a system according to the first embodiment of the present disclosure. Referring to FIG. 1, the system 10 includes a wearable display 100, a smartphone 150, a server 200, and a tablet terminal 300. The wearable display 100 and the smartphone 150 are connected by Bluetooth (registered trademark) for example. Also, the server 200 is connected with the smartphone 150 and the tablet terminal 300 by various types of wired or wireless networks.

In the system 10, the real space image is shot by the camera (the head mounted camera) mounted on the wearable display 100 of glasses type worn on the head of the first user. On the basis of this image, the image generated by processing the image of the wide angle camera described later is delivered by streaming in real time via the smartphone 150 and the server 200 to the tablet terminal 300. Thereby, the second user browsing the image at the tablet terminal 300 can have an experience as if sharing the visual perception with the first user.

Further, the second user browsing the moving image at the tablet terminal 300 may be able to input an annotation to the moving image delivered by streaming. The annotation is for example the information presented in addition to the real space picture that the first user is viewing, and may take various types of forms such as a text, an icon, and an animation. By the input of the annotation, the second user can make a comment on what appears in the sight of the first user, and provide the information with the first user, for example. That is, the second user can interfere with the experience of the first user by the annotation.

The annotation input by the second user at the tablet terminal 300 is transmitted via the server 200 to the smartphone 150, and is displayed in the sight of the first user at the wearable display 100 by the control of the smartphone 150. The annotation may be displayed in the sight of the first user transparently, and may be combined with the image displayed toward the first user. In this way, in the system 10, the interaction between the users is established with the moving image delivered by streaming as a medium.

(1-2. Device Configuration)

Figure 2:
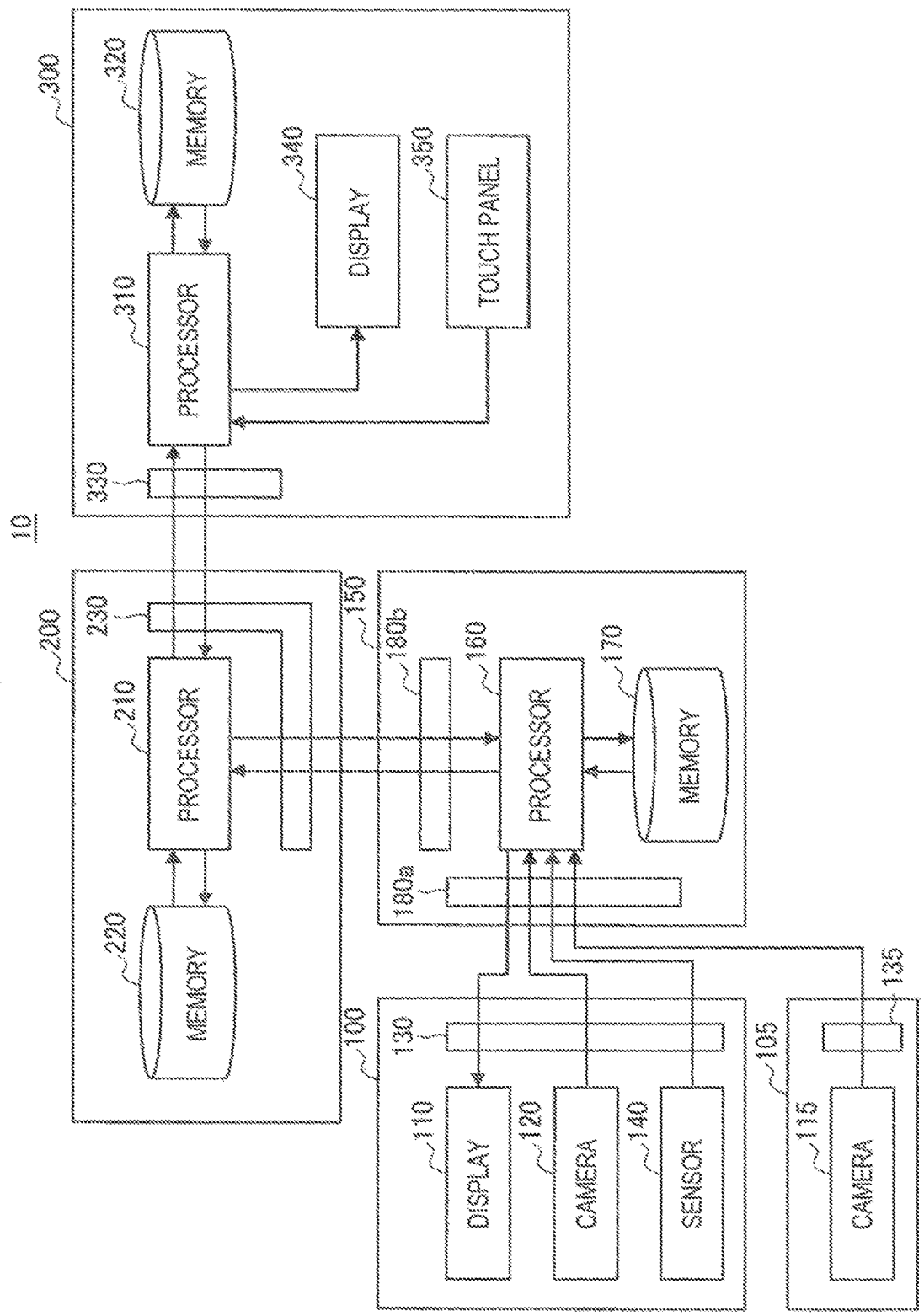
FIG. 2 is a diagram illustrating a schematic configuration of devices according to a first embodiment of the present disclosure.

FIG. 2 is a diagram illustrating the schematic configuration of devices according to the first embodiment of the present disclosure. Note that the components of each device are depicted solely with regard to the part related to the function of the embodiment described below, and each device may further include components not illustrated in the drawing. With regard to the more detailed configuration of each device, refer to the description of the hardware configuration of the information processing apparatus described later. In the following, with reference to FIG. 2, description will be made of the configuration of each device included in the system 10.

(Wearable Display)

The wearable display 100 includes a display 110, a camera 120, and a communication section 130.

The display 110 is for example an LCD or an organic EL display, and presents various types of information to the first user wearing the wearable display 100. More specifically, the display 110 may be a transparent display, or may be a display of the closed type.

More specifically, when the display 110 is of the transparent type, the first user views the surrounding real space directly through the display 110. For example, the display 110 electronically displays the additional information such as the annotation, in order to superimpose the additional information on the real space picture. On the other hand, when the display 110 is of the closed type, the first user indirectly views the surrounding real space, by the real space image in which the moving image shot by the camera 120 is processed to correspond to the sight of the first user. The display 110 displays the image in which the additional information such as the annotation is combined with the real space image. Note that, in the following description, the display 110 can be any of the transparent type and the closed type, unless otherwise described.

The camera 120 is the head mounted camera described above. The moving image shot by the camera 120 is provided via the communication section 130 to the smartphone 150, and is utilized for the generation of the image delivered to the tablet terminal 300. Also, when the display 110 is of the closed type, the image generated by processing the image shot by the camera 120 is displayed toward the first user.

The communication section 130 is a communication circuit that executes communication by Bluetooth (registered trademark) with the communication section 180a of the smartphone 150. In the present embodiment, the display 110, the camera 120, and the sensor 140 in the wearable display 100 are remotely controlled by the smartphone 150.

The sensor 140 may be, for example, an acceleration sensor, an angular velocity sensor, a gyro sensor, a geomagnetic sensor, or the like. The sensor 140 may be nine axis sensor or the like that is a combination of these sensors. The sensor 140 detects the change of the physical quantity which occurs in the wearable display 100, and outputs the change to the smartphone 150 via the communication section 130 as sensor data. The sensor data output from the sensor 140 can be utilized as the information indicating the movement of the head of the first user wearing the wearable display 100.

Note that, in another embodiment, the wearable display 100 may include a processor and a memory for the control of the display 110, the camera 120, and the sensor 140 and for other information processing. Also, further in another embodiment, the display, the camera, or the sensor in the smartphone 150 may be used instead of the display 110, the camera 120, or the sensor 140 of the wearable display 100. That is, the function of the wearable display 100 and the smartphone 150 in the present embodiment may be implemented by a single device including a display, a camera, a processor, and a memory, or may be implemented dispersedly in a plurality of devices as in the example illustrated in the drawing.

(Wide Angle Camera)

Figure 3:
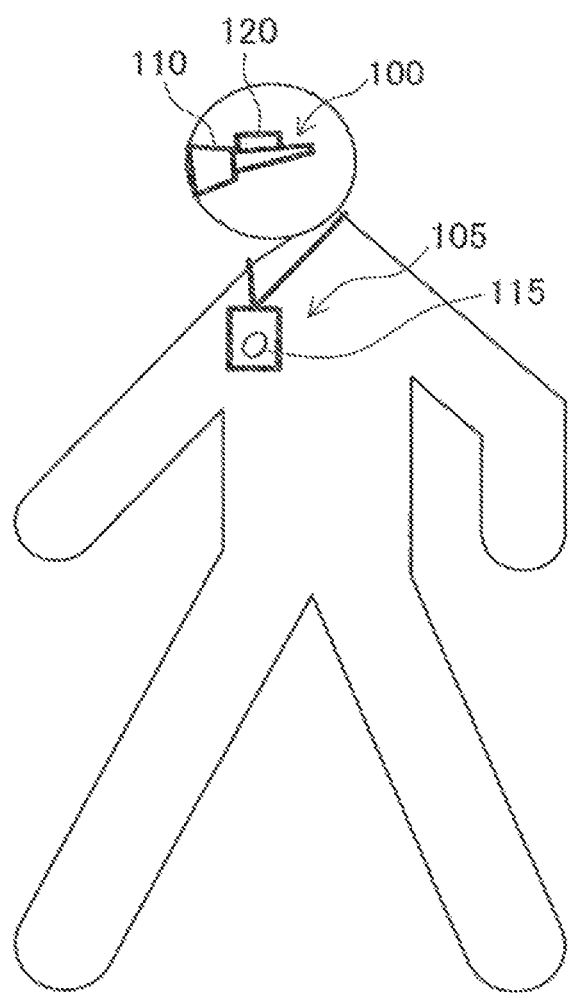
FIG. 3 is a diagram for describing a wide angle camera according to a first embodiment of the present disclosure.

Although not illustrated in FIG. 1, the wide angle camera 105 is illustrated in FIG. 2. As illustrated in FIG. 3, the wide angle camera 105 is an imaging device worn on a part other than the head of the first user wearing the wearable display 100. The wide angle camera 105 includes a camera 115, and a communication section 135. The image shot by the camera 115 is provided to the smartphone 150 via the communication section 135 which is the communication circuit that executes the communication by Bluetooth (registered trademark), for example.

Here, the wide angle camera 105 can acquire the real space image of a wider scope than the camera 120 (the imaging device worn on the head of the first user) mounted on the wearable display 100, and therefore is called the wide angle camera 105. That is, the wide angle camera 105 is not necessarily what is generally called the wide angle camera (for example, the camera including a wide angle lens), but may be a usual camera that can merely shoot a wider scope than the camera 120. Alternatively, the wide angle camera 105 may be a wide angle camera actually equipped with a wide angle lens, or may be a camera equipped with a fish eye lens, or may be an omnidirectional camera.

Also, the wide angle camera 105 is satisfactory if worn on a part other than the head of the first user wearing the wearable display 100, and is not necessarily of the neck hanging type as in the example of FIG. 3. For example, the wide angle camera 105 may be attached to clothes and accessories of the first user with a clip, a pin, or the like. Also, for example, the wide angle camera 105 may be attached to the shoulder, the lower back, and the like of the first user with a belt or the like.

Note that, likewise the above wearable display 100, in another embodiment, the wide angle camera 105 may also include a processor and a memory for the control of the camera 115 and for other information processing. Also, further in another embodiment, the camera included in the smartphone 150 may be used instead of the camera 115 of the wide angle camera 105. That is, the function of the wide angle camera 105 and the smartphone 150 in the present embodiment may be implemented by a single device including a camera, a processor, and a memory, or may be implemented dispersedly in a plurality of devices as in the example illustrated in the drawing.

(Smartphone)

The smartphone 150 includes a processor 160, a memory 170, and a communication section 180.

The processor 160 executes various types of information processing in the smartphone 150. For example, the processor 160 processes the moving image shot by the camera 115 of the wide angle camera 105, in order to deliver the moving image via the server 200 to the tablet terminal 300. At this time, the processor 160 may utilize the moving image shot by the camera 120 of the wearable display 100 and/or the sensor data output from the sensor 140 of the wearable display 100. In the memory 170, various types of data used for the processing in the processor 160 is stored.

Note that, in the present embodiment, the respective functions implemented by the processor 160 of the smartphone 150, the processor 210 of the server 200, and the processor 310 of the tablet terminal 300 are compatible. Accordingly, for example, the function described as being implemented by the processor 160 may be implemented by the processor 210 or the processor 310 in another embodiment. Likewise, the function described as being implemented by the processor 210 may be implemented by the processor 160 or the processor 310 in another embodiment. Also, the function described as being implemented by the processor 310 may be realized by the processor 160 or the processor 210 in other embodiments. The data stored in the memory 170 of the smartphone 150, the memory 220 of the server 200, and the memory 320 of the tablet terminal 300 in each embodiment differs depending on the function implemented by the processor of each device.

The communication section 180 includes a communication section 180a which is a communication circuit that executes communication by Bluetooth (registered trademark) with the communication section 130 of the wearable display 100 and the communication section 135 of the wide angle camera 105, and a communication section 180b which is a communication circuit that executes network communication with the communication section 230 of the server 200. The network communication between the communication section 180b and the communication section 230 can be executed via various types of wired or the wireless networks such as Wi-Fi, a portable phone network, and the Internet. The same thing can be applied to the network communication between the communication section 230 and the communication section 330 of the tablet terminal 300.

(Server)

The server 200 includes a processor 210, a memory 220, and a communication section 230.

The processor 210 executes various types of information processing in the server 200. For example, the processor 210 delivers the image received from the smartphone 150 via the communication section 230, to one or a plurality of the tablet terminals 300. In the memory 220, various types of data used for the process in the processor 210 is stored.

The communication section 230 is the communication circuit that executes the network communication with the communication section 180b of the smartphone 150, and with the communication section 330 of the tablet terminal 300.

(Tablet Terminal)

The tablet terminal 300 includes a processor 310, a memory 320, a communication section 330, a display 340, and a touch panel 350.

The processor 310 executes various types of information processing in the tablet terminal 300. For example, the processor 310 executes the control to display the image received from the server 200 via the communication section 330, on the display 340. Also, for example, the processor 310 may transmit the annotation and the operation instruction input by the second user via the touch panel 350, via the communication section 330 to the server 200. In the memory 320, various types of data used for the processing in the processor 310 is stored.

The communication section 330 is a communication circuit that executes network communication with the communication section 230 of the server 200.

The display 340 is an LCD or an organic EL display for example, and presents various types of the information in accordance with the control of the processor 310. For example, the display 340 displays the image generated on the basis of the image shot by the camera 115 of the wide angle camera 105. Also, the display 340 may display a graphical user interface (GUI) with which the second user inputs the input of the annotation and other operations to the image.

The touch panel 350 is located on the surface of the display 340, and detects the touch of the user as an input. The touch panel 350 detects an input of text using a software keyboard, a selection input of image and others, an input of character and pictorial figure by handwriting, and others, for example. The character and the image input via the touch panel 350 are processed by the processor 310, and are transmitted via the communication section 330 to the server 200.

Note that, in the present embodiment the image is delivered to the tablet terminal 300, but in another embodiment the image is delivered to various types of devices including a display and an input device, such as a desktop or notebook personal computer, a television, a smartphone, a media player, and a game machine, in addition to the tablet terminal 300, or instead of the tablet terminal 300. The image may be delivered to a wearable display that is different from the wearable display 100. In these cases, the input device is not limited to the touch panel illustrated in the present embodiment, but may be a keyboard, a mouse, a hardware button, or the like. Also, for the input of the annotation, audio input and gestural input may be utilized.

(1-3. Functional Configuration)

Figure 4:
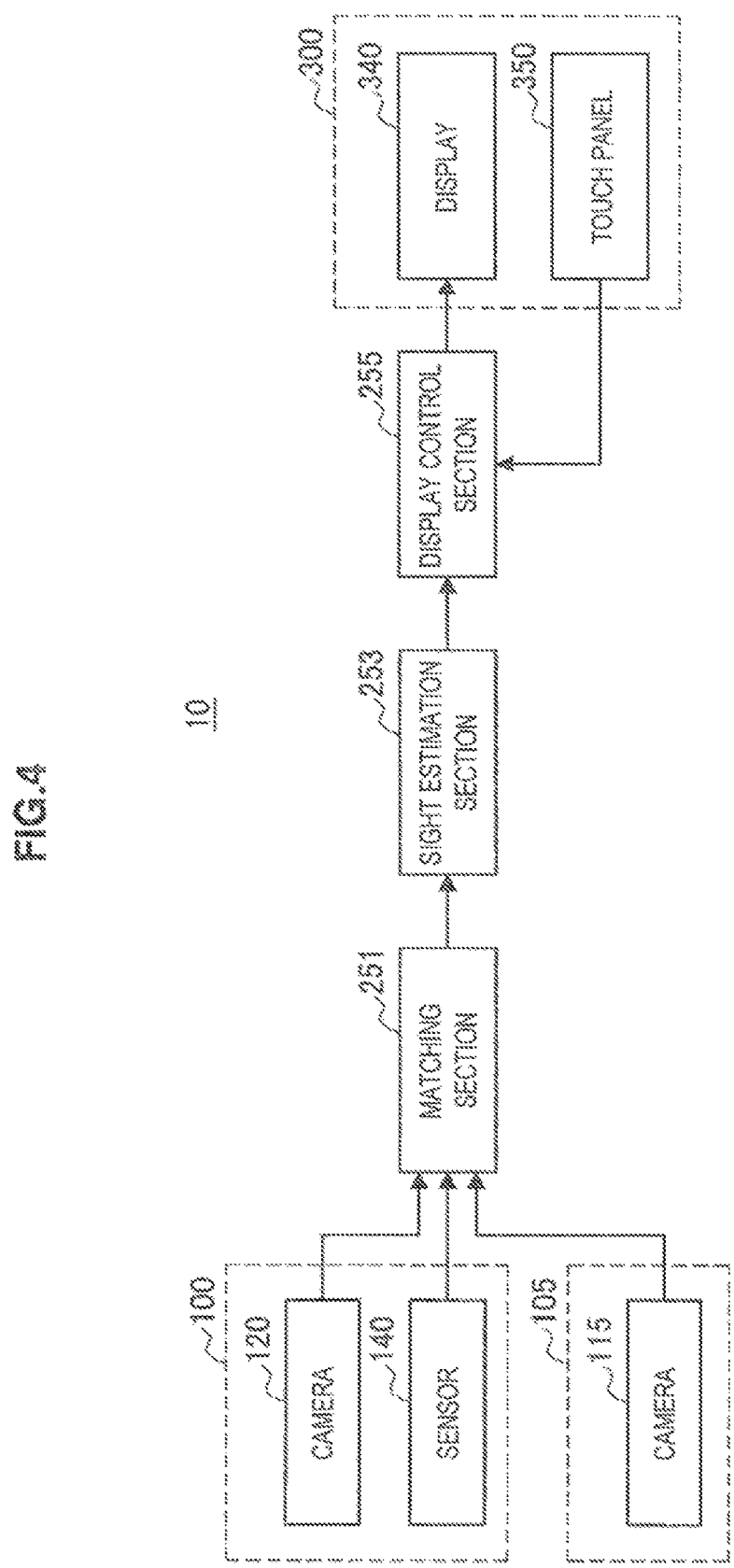
FIG. 4 is a diagram illustrating a schematic functional configuration of a system according to a first embodiment of the present disclosure.

FIG. 4 is a diagram illustrating a schematic functional configuration of the system according to the first embodiment of the present disclosure. Referring to FIG. 4, the system 10 includes a matching section 251, a sight estimation section 253, and a display control section 255, as a functional configuration. These functional configuration may be implemented by any of the processor 160 of the smartphone 150, the processor 210 of the server 200, and the processor 310 of the tablet terminal 300 for example, or may be implemented by these processors dispersedly. In the following, each functional configuration will be further described.

The matching section 251 matches the image (the first image) output from the camera 120 of the wearable display 100, or the sensor data output from the sensor 140 of the wearable display 100, to the image (the second image) output from the camera 115 of the wide angle camera 105. For example, the matching section 251 may execute any of the matching of the first image to the second image, and the matching of the sensor data to the second image, and may execute the matching of the first image and the sensor data to the second image.

For example, when matching the first image to the second image, the matching section 251 synchronizes the times of the first image and the second image, and then searches for the region that matches to the first image in the second image. As described above, the second image (output from the camera 115 of the wide angle camera 105) obtains the real space image of a wider scope than the first image (output from the camera 120 of the wearable display 100). Accordingly, the second image probably includes a region that matches to the first image. Note that, since various publicly known methods can be utilized for the matching of the images, the detailed description will be omitted.

Also, for example, when matching the sensor data and the second image, the matching section 251 synchronizes the times of the sensor data and the second image, and then relates the direction of the first user estimated on the basis of the sensor data, to the second image. For example, when the second image shoots the scope of the real space with the frontward of the body of the first user at the center, if it is estimated at a certain time on the basis of the sensor data that the first user has rotated his or her head +30 degrees in the horizontal direction, the matching section 251 identifies the direction shifted +30 degrees from the center of the second image, as the direction of the first user of this time.

Further, the matching section 251 may match both of the first image and the sensor data, to the second image. For example, the matching section 251 may match the sensor data and the second image to estimate the direction of the first user, i.e., the direction of high existence probability of the part matching to the first image in the second image, and then execute the matching to the first image, at the region of the second image corresponding to the estimated direction. Thereby, for example, the processing load for the matching of the images is reduced. Alternatively, for example, when the real space image includes many parts having the same or similar image feature, the matching of the first image and the second image is prevented from the false detection in the region that is different from the actual sight of the first user.

The sight estimation section 253 estimates the region corresponding to the sight of the first user in the image (the second image) output from the camera 115 of the wide angle camera 105, on the basis of the result of the matching by the matching section 251.

For example, when the matching section 251 matches the image (the first image) output from the camera 120 of the wearable display 100 to the second image, the sight estimation section 253 estimates that the region corresponding to the sight of the first user is included in the region that matches to the first image in the second image. Here, when the scope of the first image is wider than the sight of the first user, the sight estimation section 253 may identify a part of the region that matches to the first image in the second image, as the region corresponding to the sight of the first user, on the basis of the result of the calibration of the camera 120 conducted in advance and others, for example.

Also, for example, when the matching section 251 matches the sensor data and the second image, the sight estimation section 253 estimates that the region corresponding to the direction of the first user estimated on the basis of the sensor data is the region corresponding to the sight of the first user. In this case, the sight estimation section 253 may set in advance a predetermined size of region corresponding to the sight of the first user, and locate the predetermined size of region with reference to the position corresponding to the direction of the first user in the second image.

On the basis of the result of the estimation of the sight by the sight estimation section 253, the display control section 255 generates the image expressing the sight of the first user using the image (the second image) output from the camera 115 of the wide angle camera 105, and displays the generated image via the display 340 of the tablet terminal 300 toward the second user. Also, the display control section 255 may change the generated image on the basis of the operation of the second user acquired via the touch panel 350 of the tablet terminal.

For example, the display control section 255 may generate the image in which the first image is combined with the region corresponding to the sight of the first user in the second image. In this case, the generated image includes a wider scope than the sight of the first user (not necessarily all scope of the second image), and the first image is located therein. Note that, as described above, when the scope of the first image is wider than the sight of the first user, the image cutting out a part of the first image can be combined with the second image. When the first user tilts and turns his or her head to change the sight of the first user, in response the region with which the first image is combined moves. However, unless the first user changes the direction of the whole body, the view angle of the image generated on the basis of the second image does not change significantly. Accordingly, in this example, the image in which the viewpoint image (displayed on the basis of the first image) moves around in response to the change of the sight of the first user in the background image (displayed on the basis of the second image) that does not change significantly, is generated. By the image like this, for example, while expressing the change of the sight of the first user, the video image sickness and the loss of the sense of space are made less likely to occur even when the sight moves rapidly. Alternatively, the situation of the real space of the wider scope which is the background of the sight of the first user is perceived in addition to the sight of the first user.

Note that, as in the above example, even when the display control section 255 uses the first image in the generation of the image, the first image is not necessarily used in the processes of the matching section 251 and the sight estimation section 253. That is, for example, when the display control section 255 generates the image in which the first image is combined with the region corresponding to the sight of the first user in the second image, the region corresponding to the sight of the first user may be estimated by the matching of the first image and the second image, or may be estimated by the matching of the sensor data and the second image.

Also, for example, the display control section 255 may generate the image marking the region corresponding to the sight of the first user in the second image. In this case as well, the generated image includes the wider scope than the sight of the first user (not necessarily the whole scope of the second image), a part of which is marked as the region corresponding to the sight of the first user. When the first user tilts and turns his or her head to change the sight of the first user, in response the marking moves. However, unless the first user changes the direction of the whole body, the view angle of the image generated on the basis of the second image does not change significantly. Accordingly, in this example, the image in which the marking representing the sight of the first user moves around in the image (displayed on the basis of the second image) that does not change significantly, is generated. By the image like this, likewise the above example, while expressing the change of the sight of the first user, the video image sickness and the loss of the sense of space are made less likely to occur even when the sight moves rapidly. Alternatively, the situation of the real space of the wider scope which is the background of the sight of the first user is perceived in addition to the sight of the first user.

As in the above example, when the display control section 255 does not use the first image in the generation of the image, the first image does not have to be the image of the quality taking account of the display. That is, the first image is satisfactory if it has the sufficient quality (the resolution and the like) for the matching with the second image in the matching section 251. Accordingly, the reduction in size and weight of the camera 120 mounted in the wearable display 100 is made easy.

Note that, when the display control section 255 does not use the first image in the generation of the image, and the matching section 251 conducts only the matching of the sensor data and the second image, the camera 120 may not be provided in the wearable display 100. Conversely, when the matching section 251 conducts only the matching of the first image and the second image, the sensor 140 may not be provided in the wearable display 100.

In the above two examples, the display control section 255 may change the display position of the second image in such a manner to position the region corresponding to the sight of the first user frontward. For example, when the image is generated by cutting out a part of the second image, the display control section 255 may set the cutout region in the second image in such a manner that the region corresponding to the sight of the first user gets closer to the center of the image after cutting out. Alternatively, when the second image is shot by the camera equipped with the fish eye lens or the omnidirectional camera, the display control section 255 may rotate the second image in such a manner to position the region corresponding to the sight of the first user in a predetermined direction (for example, downward).

Also, for example, the display control section 255 may generate the image cutting out the region corresponding to the sight of the first user from the second image. In this case, the generated whole image corresponds to the sight of the user in the first image. When the first user tilts and turns his or her head to change the sight of the first user, in response the view angle of the generated image changes. Accordingly, in this example, the image with which the sight of the first user is more directly experienced is generated.

Note that, when the scope of the first image is wider than the sight of the first user, the same image as the above example can be generated from the first image as well. However, the wide angle camera 105 worn on the part other than the head has a laxer limitation of size and weight of the camera itself, than the camera 120 mounted on the wearable display 100 worn on the head of the user does, so that the performance of the camera is easily improved. Accordingly, as in the above example, there is an advantage in generating the image cutting out the region corresponding to the sight of the first user from the second image.

Also, as in the above example, the smoothing of the movement of the sight is easier when the image (hereinafter, also referred to as the viewpoint image) cutting out the region corresponding to the sight of the first user from the second image is generated, than when the same viewpoint image is generated from the first image. For example, when the sight of the first user rapidly moves, delaying the movement of the viewpoint and suppressing the vibration of the displacement in the image provided to the second user are conceived of to prevent the video image sickness and the loss of the sense of space. However, when the viewpoint image is generated from the first image, even if the scope of the first image is wider than the sight of the first user, the scope is limited. Accordingly, when the sight moves beyond the scope, the smoothing of the movement of the sight is difficult. On the other hand, when the viewpoint image is generated from the second image, since the scope of the second image is still wider than the scope of the first image, the smoothing can be conducted to the movement of the sight in the wider scope.

Note that the smoothing of the movement of the sight of the first user is not limited to when generating the viewpoint image from the second image, but is also applicable to when combining the first image with the region corresponding to the sight of the first user in the second image, as well as when generating the image marking the region corresponding to the sight of the first user in the second image. In these cases as well, since rapid movement of the marking or the first image corresponding to the sight of the first user impairs the viewability of the second user, the image in which the movement of the sight is smoothed and the first image and the marking moderately moves is generated.

(1-4. Example of Process)

Figure 5:
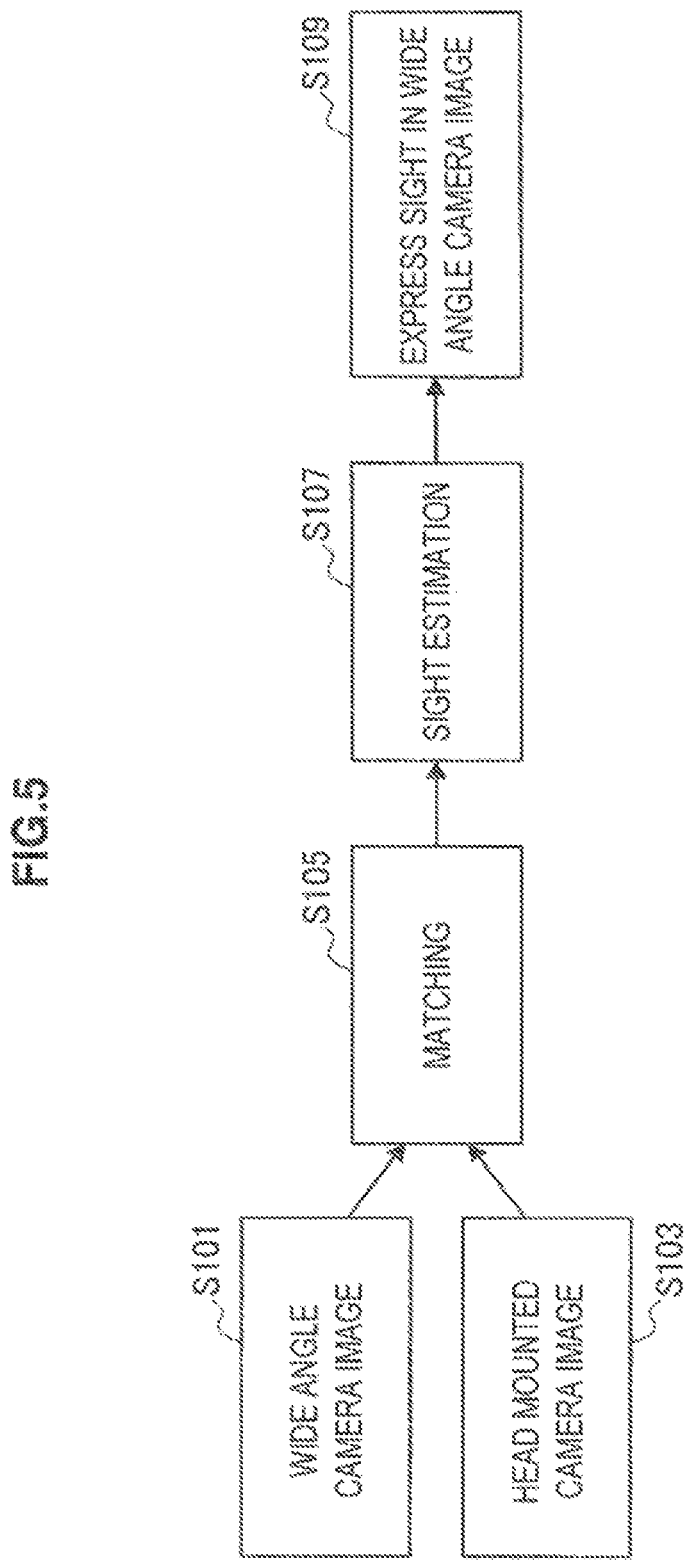
FIG. 5 is a diagram illustrating a first example of a process in a first embodiment of the present disclosure.

FIG. 5 is a diagram illustrating the first example of the process in the first embodiment of the present disclosure. Referring to FIG. 5, the image of the wide angle camera 105 (S101) and the image of the head mounted camera, i.e., the camera 120 mounted on the wearable display 100 (S103) are acquired, and are matched in the matching section 251 (S105). The sight estimation section 253 estimates the sight of the first user on the basis of the result of the matching (S107). Further, on the basis of the result of the estimation of the sight, the display control section 255 expresses the sight of the first user in the wide angle camera image (the above second image) (S109). The expression method of the sight of the first user in the wide angle camera image is as illustrated above.

Figure 6:
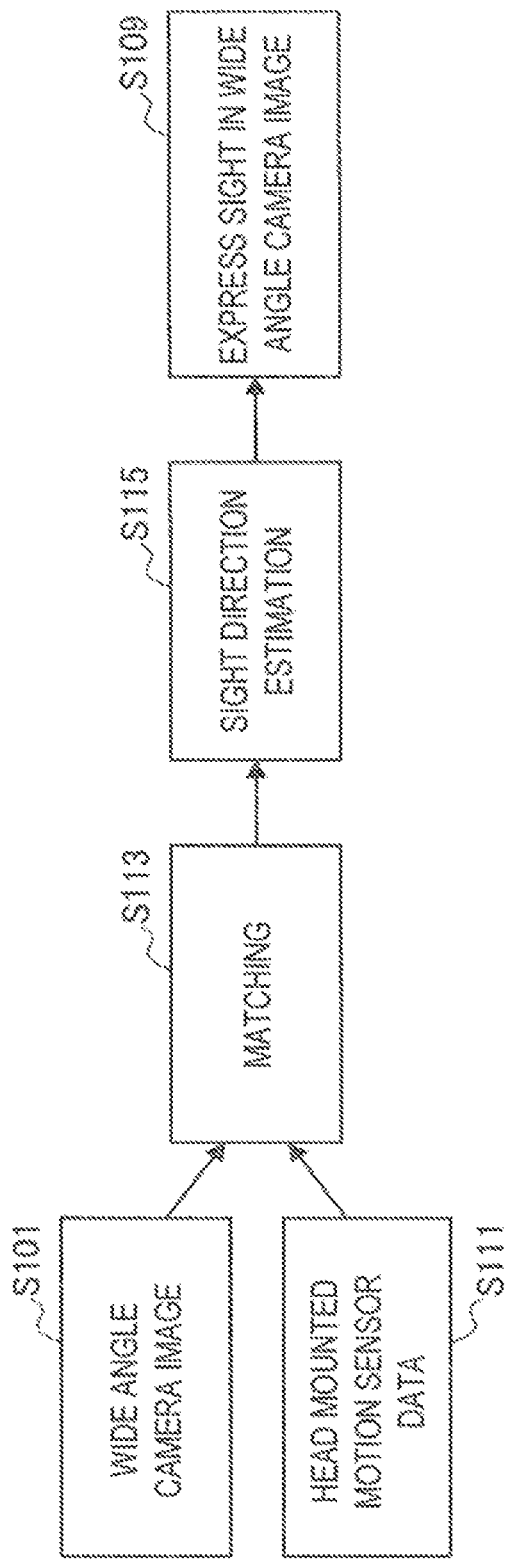
FIG. 6 is a diagram illustrating a second example of a process in a first embodiment of the present disclosure.

FIG. 6 is a diagram illustrating the second example of the process in the first embodiment of the present disclosure. Referring to FIG. 6, the image of the wide angle camera 105 (S101) and the head mounted motion sensor data, i.e., the sensor data acquired by an acceleration sensor, an angular velocity sensor, a gyro sensor or the like included in the sensor 140 mounted on the wearable display 100 (S111) are acquired, and are matched in the matching section 251 (S113). The sight estimation section 253 estimates the direction of the sight of the first user on the basis of the result of the matching (S115). Further, the display control section 255 expresses the sight of the first user in the wide angle camera image (the above second image) on the basis of the result of the estimation of the direction of the sight (S109).

(1-5. Exemplary Display)

Figure 7:
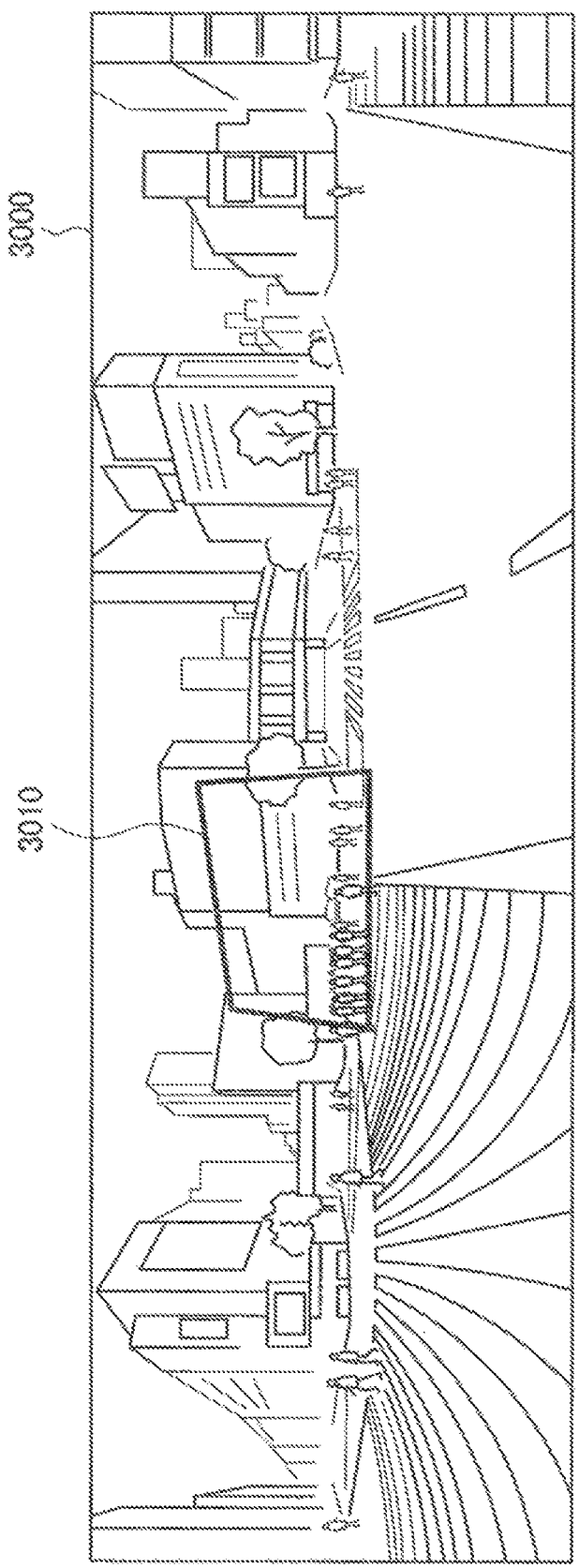
FIG. 7 is a diagram illustrating an exemplary display of a first embodiment of the present disclosure.

FIG. 7 is a diagram illustrating an exemplary display of the first embodiment of the present disclosure. In FIG. 7, an example of the image 3000 displayed on the display 340 of the tablet terminal 300 is illustrated. In the example illustrated in the drawing, the image 3000 is generated by spreading the second image shot by the omnidirectional camera. Note that, in another example, the second image may be shot by a usual camera, the camera equipped with the wide angle lens, the camera equipped with the fish eye lens, or the like, as described above.

In the image 3000, the sight of the first user is expressed by the marking 3010. The marking 3010 is displayed on the region corresponding to the sight of the first user, which is estimated by the above sight estimation section 253. The display control section 255 adjusts the display position in the horizontal direction of the image 3000 which is the spread omnidirectional image, in such a manner that the marking 3010 is positioned near the center.

Note that, as described already, in another example, the first image shot by the camera 120 of the wearable display 100 may be combined with the same region as the marking 3010. Alternatively, further in another example, the same region as the marking 3010 may be cut out as the region corresponding to the sight of the first user. The second user of the tablet terminal 300 may be able to switch these displays from one to another by a viewpoint switch button displayed as a GUI, gestural control via the touch panel 350, the space gestural operation, or the like, for example.

(1-6. Variant Example)

In the description of the above present embodiment, the matching executed between the sensor data output from the sensor 140 mounted on the wearable display 100, and the second image shot by the camera 115 of the wide angle camera 105 is illustrated, but the embodiment of the present disclosure is not limited to the example like this. For example, a sensor such as an acceleration sensor may be mounted in the wide angle camera 105 as well, and the matching may be executed between the sensor data by the sensor 140 of the wearable display 100, the sensor data by the sensor of the wide angle camera 105, and the second image. In this case, since the orientation of the wide angle camera 105 relative to the wearable display 100 is detected by the matching of the sensor data, the direction of the first user is more accurately estimated. Also, in this case as well, likewise the above example, the matching may be executed by further combining the first image.

(2. Second Embodiment)

Next, the second embodiment of the present disclosure will be described. Note that, with regard to the same configuration (the system configuration and the device configuration) as the above first embodiment, the duplicative description will be omitted.

Figure 8:
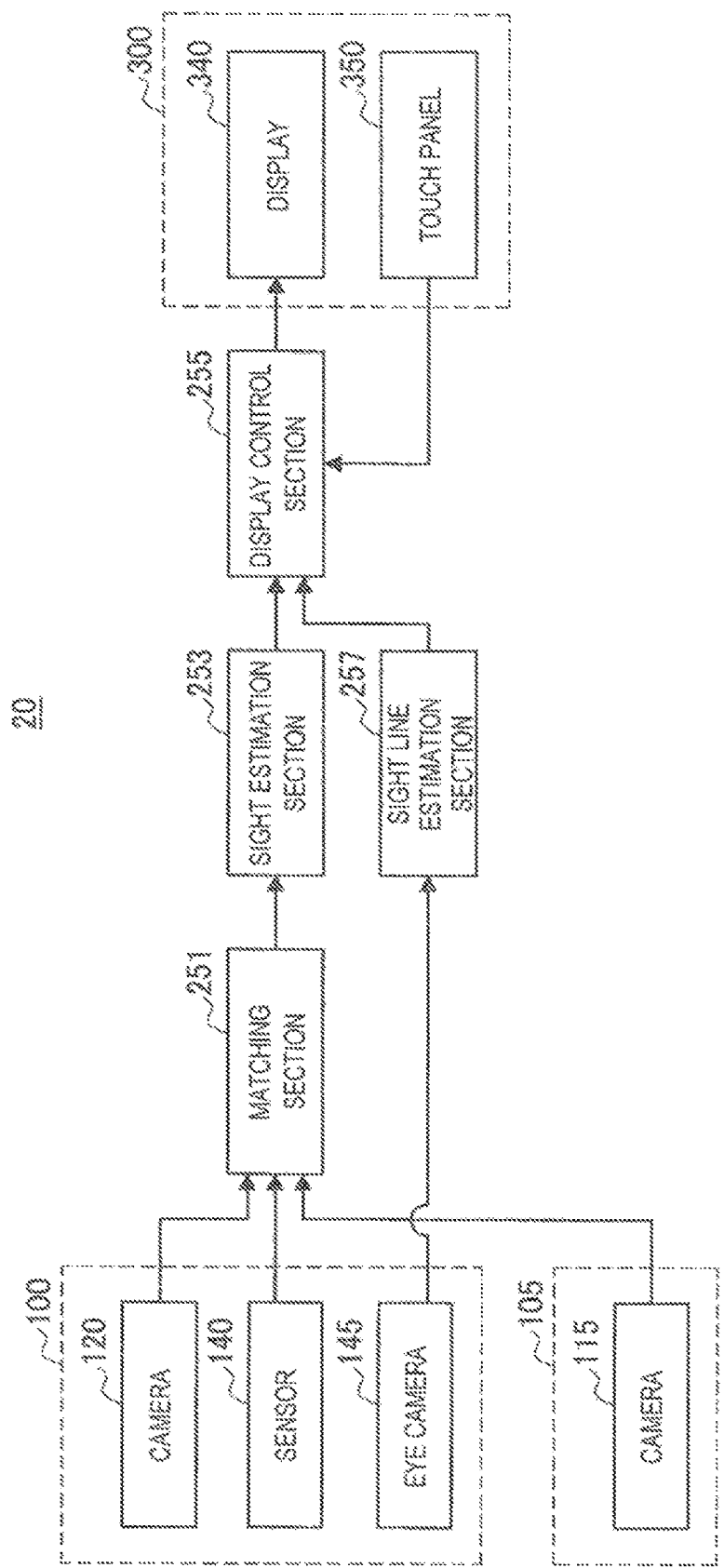
FIG. 8 is a diagram illustrating a schematic functional configuration of a system according to a second embodiment of the present disclosure.

FIG. 8 is a diagram illustrating a schematic functional configuration of the system according to the second embodiment of the present disclosure. Referring to FIG. 8, the system 20 includes a matching section 251, a sight estimation section 253, a display control section 255, and a sight line estimation section 257, as a functional configuration. These functional configuration may be implemented by any of the processor 160 of the smartphone 150, the processor 210 of the server 200, and the processor 310 of the tablet terminal 300 for example, or may be implemented dispersedly in these processors. Also, in the system 20, the eye camera 145 is provided in the wearable display 100. In the following, each functional configuration will be further described.

In the present embodiment, the functions of the matching section 251 and the sight estimation section 253 are same as the above first embodiment. On the other hand, the display control section 255 generates the image expressing the sight line direction of the first user, in addition to the sight of the first user, on the basis of the information provided from the sight line estimation section 257. Note that, the expression of the sight of the first user in the image generated by the display control section 255 is same as the above first embodiment. The sight line estimation section 257 estimates the sight line direction of the first user, on the basis of the shot image by the eye camera 145. Since various publicly known methods can be utilized for the estimation of the sight line direction based on the eye camera shooting image, the detailed description will be omitted.

Figure 9:
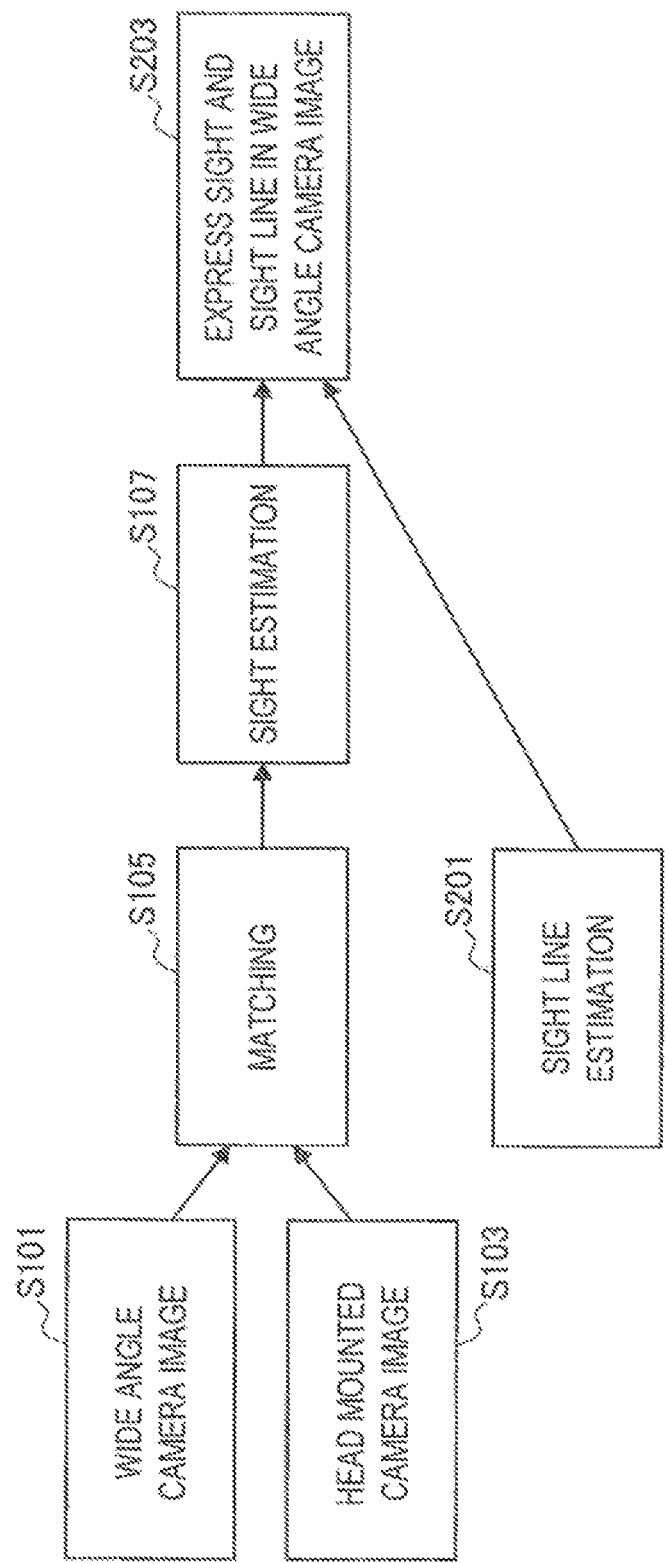
FIG. 9 is a diagram illustrating an example of a process in a second embodiment of the present disclosure.

FIG. 9 is a diagram illustrating an example of the process in the second embodiment of the present disclosure. Referring to FIG. 9, the image of the wide angle camera 105 (S101) and the image of the head mounted camera, i.e., the camera 120 mounted on the wearable display 100 (S103) are acquired, and are matched in the matching section 251 (S105). The sight estimation section 253 estimates the sight of the first user on the basis of the result of the matching (S107). The processes so far are same as the above first embodiment.

In the present embodiment, in addition to the above process, the sight line estimation section 257 estimates the sight line direction of the first user on the basis of the shot image by the eye camera 145 (S201). The display control section 255 expresses the sight of the first user and the sight line direction in the wide angle camera image (the above second image), on the basis of the result of the estimation of the sight of the first user by the sight estimation section 253, and the result of the estimation of the sight line direction of the first user by the sight line estimation section 257 (S203). The expression method of the sight of the first user in the wide angle camera image is as illustrated in the first embodiment.

Figure 10:
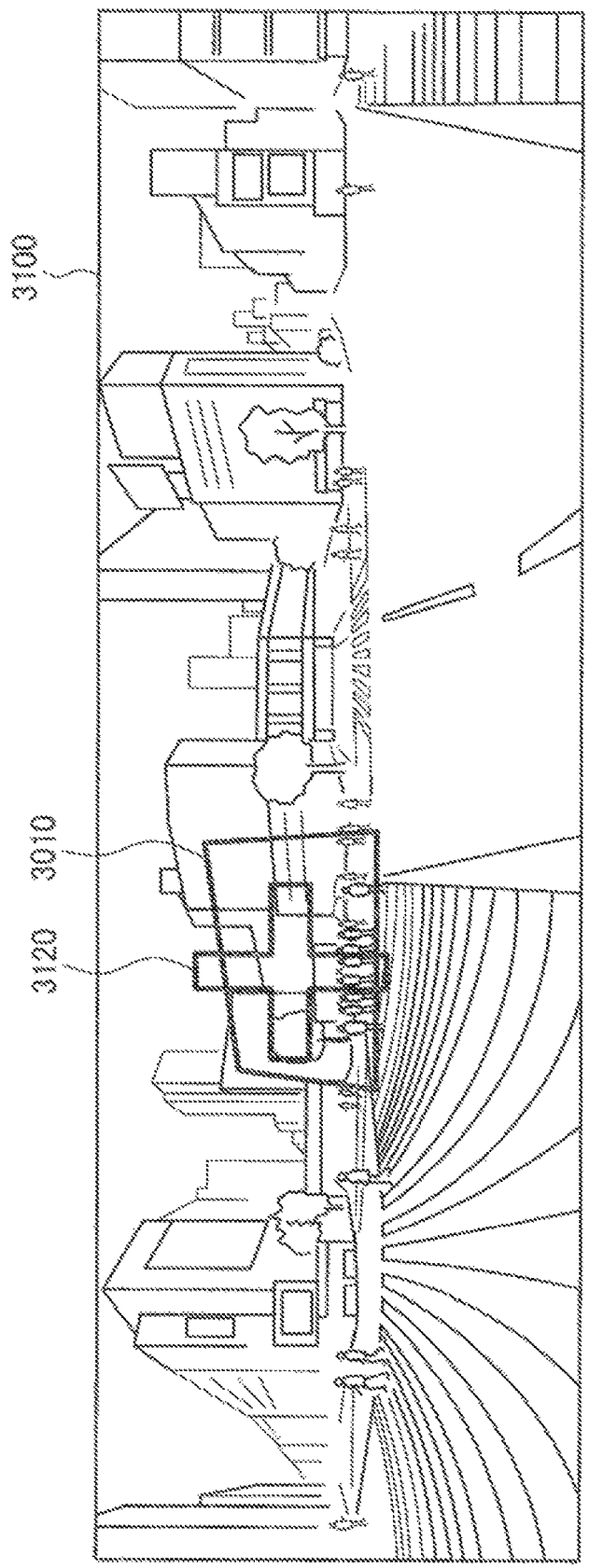
FIG. 10 is a diagram illustrating an exemplary display of a second embodiment of the present disclosure.

FIG. 10 is a diagram illustrating an exemplary display of the second embodiment of the present disclosure. In FIG. 10, an example of the image 3000 displayed on the display 340 of the tablet terminal 300 is illustrated. In the example illustrated in the drawing, the image 3100 is generated by spreading the second image shot by the omnidirectional camera. Note that, in another example, the second image may be shot by a usual camera, a camera equipped with the wide angle lens, the camera equipped with the fish eye lens, or the like, as described above.

In the image 3100, the sight of the first user is expressed by the same marking 3010 as the example of above FIG. 7.

Further, in the image 3100, the sight line direction of the first user is expressed by the sight line marking 3120. The sight line marking 3120 is displayed, centering the position corresponding to the sight line direction of the first user, which is estimated by the above sight line estimation section 257. In a standard case, the sight line marking 3120 is displayed inside the marking 3010 representing the sight of the first user. Note that, when the movement of the sight of the first user is smoothed for example, the sight marking 3120 may move first to go out of the marking 3010, for the purpose of expressing the occurrence of the change of the sight, while suppressing the rapid change of the image.

Note that, likewise the first embodiment, in another example of the present embodiment, the first image shot by the camera 120 of the wearable display 100 may be combined with the same region as the marking 3010. Alternatively, further in another example, the same region as the marking 3010 may be cut out as the region corresponding to the sight of the first user. In these cases as well, the sight line marking 3120 can be displayed. The shape of the sight line marking 3120 is not limited to the cross shape as in the example illustrated in FIG. 10, but can be various types of shapes such as a circle, a rectangle, or a point.

(3. Hardware Configuration)

Figure 11:
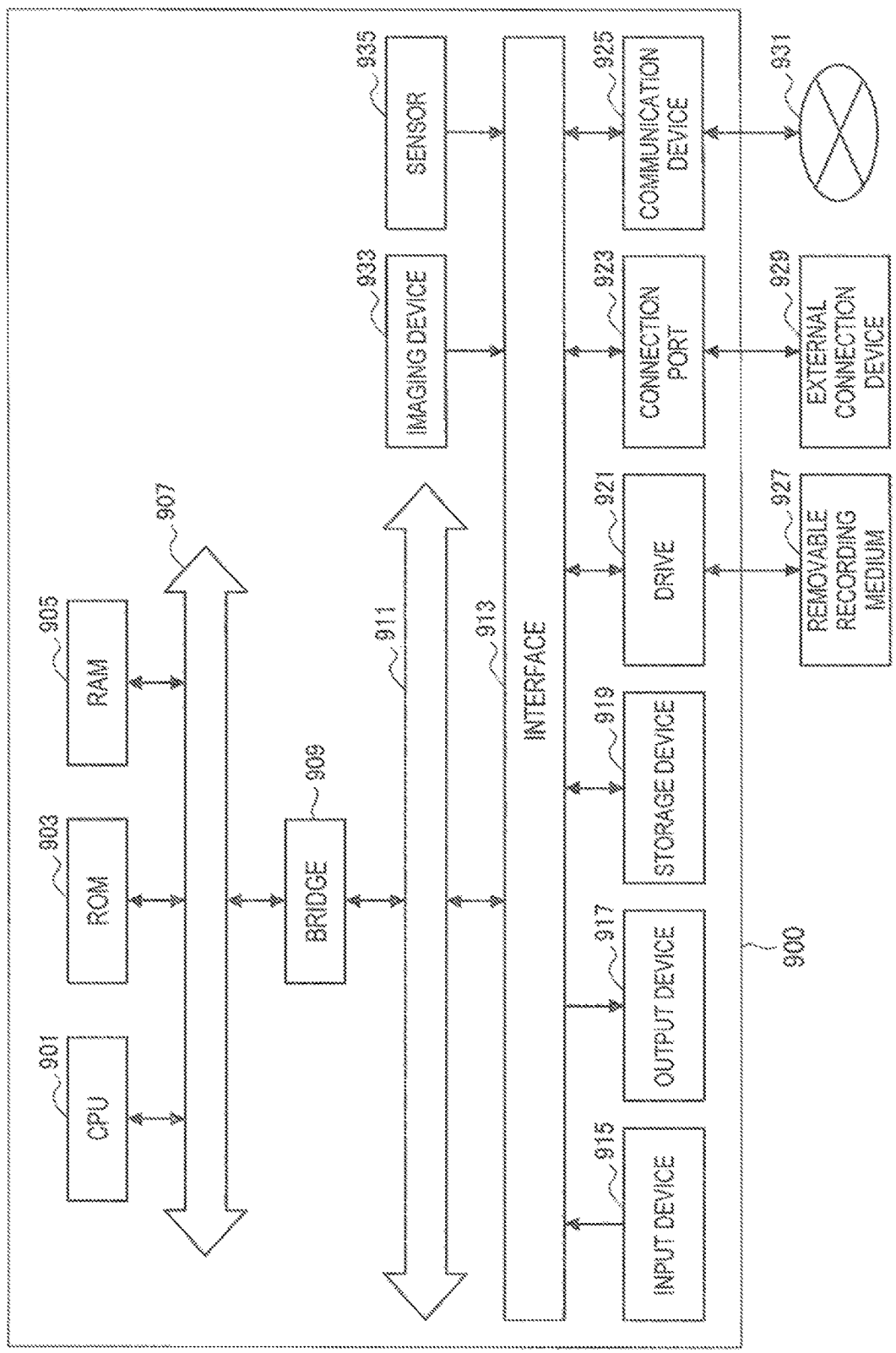
FIG. 11 is a block diagram illustrating an exemplary hardware configuration of an information processing apparatus according to an embodiment of the present disclosure.

Next, with reference to FIG. 11, description will be made of a hardware configuration of the information processing apparatus according to the embodiment of the present disclosure. FIG. 11 is a block diagram illustrating an exemplary hardware configuration of the information processing apparatus according to the embodiment of the present disclosure. The information processing apparatus 900 illustrated in the drawing can realize the smartphone 150, the server 200, the tablet terminal 300, and the like in the above embodiment, for example.

The information processing apparatus 900 includes a CPU (Central Processing Unit) 901, a ROM (Read Only Memory) 903, and a RAM (Random Access Memory) 905. In addition, the information processing apparatus 900 may include a host bus 907, a bridge 909, an external bus 911, an interface 913, an input device 915, an output device 917, a storage device 919, a drive 921, a connection port 923, and a communication device 925. Further, the information processing apparatus 900 may include an imaging device 933 and a sensor 935 as necessary. The information processing apparatus 900 may include a processing circuit such as a DSP (Digital Signal Processor) or ASIC (Application Specific Integrated Circuit), alternatively or in addition to the CPU 901.

The CPU 901 serves as an operation processor and a controller, and controls all or some operations in the information processing apparatus 900 in accordance with various programs recorded in the ROM 903, the RAM 905, the storage device 919 or a removable recording medium 927. The ROM 903 stores programs and operation parameters which are used by the CPU 901. The RAM 905 primarily stores program which are used in the execution of the CPU 901 and parameters which is appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 may be a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the information processing apparatus 900. Furthermore, the input device 915 includes an input control circuit which generates an input signal on the basis of the information which is input by a user and outputs the input signal to the CPU 901. By operating the input device 915, a user can input various types of data to the information processing apparatus 900 or issue instructions for causing the information processing apparatus 900 to perform a processing operation.

The output device 917 includes a device capable of visually or audibly notifying the user of acquired information. The output device 917 may include a display device such as LCD (Liquid Crystal Display), PDP (Plasma Display Panel), and organic EL (Electro-Luminescence) displays, an audio output device such as speaker and headphone, and a peripheral device such as printer. The output device 917 may output the results obtained from the process of the information processing apparatus 900 in a form of a video such as text or image, and an audio such as voice or sound.

The storage device 919 is a device for data storage which is configured as an example of a storage unit of the information processing apparatus 900. The storage device 919 includes, for example, a magnetic storage device such as HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing apparatus 900 or attached externally thereto. The drive 921 reads information recorded in the removable recording medium 927 attached thereto, and outputs the read information to the RAM 905. Further, the drive 921 can write in the removable recording medium 927 attached thereto.

The connection port 923 is a port used to directly connect devices to the information processing apparatus 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (High-Definition Multimedia Interface) port, and so on. The connection of the external connection device 929 to the connection port 923 makes it possible to exchange various data between the information processing apparatus 900 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, or a sound sensor, for example. The sensor 935 acquires information regarding the state of the information processing apparatus 900, such as the orientation of the case of the information processing apparatus 900, as well as information regarding the environment surrounding the information processing apparatus 900, such as the brightness or noise surrounding the information processing apparatus 900, for example. The sensor 935 may also include a Global Positioning System (GPS) sensor that receives GPS signals and measures the latitude, longitude, and altitude of the apparatus.

The foregoing thus illustrates an exemplary hardware configuration of the information processing apparatus 900. Each of the above components may be realized using general-purpose members, but may also be realized in hardware specialized in the function of each component. Such a configuration may also be modified as appropriate according to the technological level at the time of the implementation.

(4. Supplement)

The embodiment of the present disclosure includes, for example, the display control devices (the smartphone, the server, the tablet terminal, and the like) describe above, a system, a display control method executed in the display control device or the system, a program causing the display control device to function, and a non-transitory tangible medium having a program stored therein.

The preferred embodiment of the present disclosure has been described above in detail with reference to the accompanying drawings, whilst the technical scope of the present disclosure is not limited to such an example. A person having ordinary knowledge in the technical field of the present disclosure obviously can conceive of various alterations and modifications within the scope of the technical concept recited in the appended claims, and it should be understood that they will naturally come under the technical scope of the present disclosure.

Also, the effects described in the present specification are only explanatory and exemplary, and are not restrictive. That is, the technology according to the present disclosure can achieve other effects which are obvious for a person skilled in the art from the description of the present specification, in addition to the above effects or instead of the above effects. Additionally, the present technology may also be configured as below.

(1) A display control device including a matching section configured to match a first image or sensor data output from a first imaging device or a sensor worn on a head of a first user, to a second image output from a second imaging device worn on a part other than the head of the first user, a sight estimation section configured to estimate a region corresponding to a sight of the first user in the second image, on the basis of a result of the matching, and a display control section configured to generate an image expressing the sight of the first user using the second image on the basis of a result of the estimation of the sight, and display the image expressing the sight of the first user toward a second user that is different from the first user.

(2) The display control device according to (1), wherein
the matching section matches the first image output from the first imaging device, to the second image, and
the sight estimation section estimates that a region matched to the first image in the second image includes the region corresponding to the sight of the first user.

(3) The display control device according to (2), wherein
the matching section matches the sensor data output from the sensor, to the second image, and
the sight estimation section estimates that a region corresponding to a direction of the first user, estimated on the basis of the sensor data is the region corresponding to the sight of the first user.

(4) The display control device according to (3), wherein
the sensor includes an acceleration sensor, an angular velocity sensor, a gyro sensor, or a geomagnetic sensor.

(5) The display control device according to any one of (1) to (5), further including:
a sight line estimation section configured to estimate a sight line direction of the first user,
wherein the display control section generates an image expressing the sight line direction of the first user, in addition to the sight of the first user.

(6) The display control device according to any one of (1) to (5), wherein
the display control section smoothes movement of the sight of the first user, when generating the image expressing the sight of the first user.

(7) The display control device according to any one of (1) to (6), wherein
the display control section generates an image in which the first image is combined with the region corresponding to the sight of the first user in the second image.

(8) The display control device according to any one of (1) to (7), wherein
the display control section generates an image marking the region corresponding to the sight of the first user in the second image.

(9) The display control device according to any one of (1) to (8), wherein
the display control section generates an image in which a display position of the second image is changed in such a manner that the region corresponding to the sight of the first user is positioned frontward.

(10) The display control device according to any one of (1) to (6), wherein
the display control section generates an image of the region corresponding to the sight of the first user, the region being cut out from the second image.

(11) A display control method including:
matching a first image or sensor data output from a first imaging device or a sensor worn on a head of a first user, to a second image output from a second imaging device worn on a part other than the head of first user;
estimating a region corresponding to a sight of the first user in the second image, on the basis of a result of the matching; and
generating, by a processor, an image expressing the sight of the first user using the second image on the basis of a result of the estimation of the sight, and displaying the image expressing the sight of the first user toward a second user that is different from the first user.

(12) A program for causing a computer to implement:
a function to match a first image or sensor data output from a first imaging device or a sensor worn on a head of a first user, to a second image output from a second imaging device worn on a part other than the head of the first user;
a function to estimate a region corresponding to a sight of the first user in the second image on the basis of a result of the matching; and
a function to generate an image expressing the sight of the first user using the second image on the basis of a result of the estimation of the sight, and display the image expressing the sight of the first user toward a second user that is different from the first user.

What is claimed is:

1. An information processing apparatus, comprising:
at least one Central Processing Unit (CPU) configured to:
receive sight information corresponding to a direction of a first display terminal of a first user;
receive a background image from a wide-angle camera, wherein the wide-angle camera captures the background image having a view angle wider than a view angle of a display of the first display terminal; and
send display information to a second display terminal of a second user, wherein the second display terminal displays a marking image within the background image based on the display information, wherein the marking image is based on the sight information, and the marking image indicates a viewing perception of the first user in the background image,
wherein the first display terminal is separate from the wide-angle camera such that the direction of the first display terminal is changed independently from a direction of the wide-angle camera, and
wherein a viewpoint of the background image is moved based on a movement of the wide-angle camera in a real space independently of the first display terminal.

2. The information processing apparatus according to claim 1, wherein the at least one CPU is further configured to receive sensor data associated with the sight information, and wherein the sensor data is output from a sensor worn on a head of the first user.

3. The information processing apparatus according to claim 2, wherein the received sensor data corresponds to movement information of the head of the first user.

4. The information processing apparatus according to claim 3, wherein the sight information is associated with a direction of the head of the first user.

5. The information processing apparatus according to claim 4, wherein the wide-angle camera is mountable on a part of a body of the first user other than the head of the first user, and wherein the background image is associated with a direction of the body of the first user.

6. The information processing apparatus according to claim 2, wherein the sensor includes a motion sensor.

7. The information processing apparatus according to claim 1, wherein the at least one CPU is further configured to receive a sight image as the sight information, and wherein the sight image is output from an imaging device of the first user.

8. The information processing apparatus according to claim 2, wherein the at least one CPU is further configured to:
synchronize a first time of a first image, associated with the first display terminal, to a second time of the background image, wherein the first time is synchronized with the second time based on the sensor data of the first display terminal; and
determine a region, within the background image, that matches the first image, wherein the region is determined based on the synchronization.

9. The information processing apparatus according to claim 1, wherein the least one CPU is at least a part of a network server.

10. The information processing apparatus according to claim 9, wherein the network server is configured to:
receive annotation information from the second user; and
add an annotation to the background image based on the annotation information.

11. The information processing apparatus according to claim 9, wherein the network server is configured to send graphical user interface information to the second display terminal, wherein the second display terminal displays at least one graphical user interface for input of an annotation, and wherein the at least one graphical user interface is displayed based on the graphical user interface information.

12. The information processing apparatus according to claim 1, wherein the marking image includes a contour having at least one of a rectangle shape or a circle shape, and wherein the at least one of the rectangle shape or the circle shape substantially corresponds to the viewing perception of the first user.

13. The information processing apparatus according to claim 12, wherein the second display terminal initiates the display of the marking image based on a user input on the second display terminal.

14. The information processing apparatus according to claim 13, wherein the second display terminal is a hand-held terminal that includes a touch panel, wherein the touch panel receives a gesture input as the user input.

15. A display control method comprising:
in at least one central processing unit (CPU):
receiving sight information corresponding to a direction of a first display terminal of a first user;
receiving a background image from a wide-angle camera, wherein the wide-angle camera captures the background image having a view angle wider than a view angle of a display of the first display terminal; and
sending display information to a second display terminal of a second user, wherein the second display terminal displays a marking image within the background image based on the display information, wherein the marking image is based on the sight information, and the marking image indicates a viewing perception of the first user in the background image,
wherein the first display terminal is separate from the wide-angle camera such that the direction of the first display terminal is changed independently from a direction of the wide-angle camera, and
wherein a viewpoint of the background image is moved based on a movement of the wide-angle camera in a real space independently of the first display terminal.

16. A non-transitory computer-readable medium having stored thereon computer-executable instructions which when executed by a computer, cause the computer to execute operations, the operations comprising:
receiving sight information corresponding to a direction of a first display terminal of a first user;
receiving a background image from a wide-angle camera, wherein the wide-angle camera captures the background image having a view angle wider than a view angle of a display of the first display terminal; and sending display information to a second display terminal of a second user, wherein the second display terminal displays a marking image within the background image based on the display information, wherein the marking image is based on the sight information, and the marking image indicates a viewing perception of the first user in the background image, wherein the first display terminal is separate from the wide-angle camera such that the direction of the first display terminal is changed independently from a direction of the wide-angle camera, and wherein a viewpoint of the background image is moved based on a movement of the wide-angle camera in a real space independently of the first display terminal.

* * * * *